US010897216B2

(12) United States Patent
Liang

(10) Patent No.: US 10,897,216 B2
(45) Date of Patent: Jan. 19, 2021

(54) VARIABLE FREQUENCY DRIVE SYSTEM

(71) Applicant: Hyperloop Technologies, Inc., Los Angeles, CA (US)

(72) Inventor: Jiaqi Liang, Pasadena, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/338,102

(22) Filed: Oct. 28, 2016

(65) Prior Publication Data

US 2017/0126163 A1    May 4, 2017

Related U.S. Application Data

(60) Provisional application No. 62/247,954, filed on Oct. 29, 2015.

(51) Int. Cl.
  *H02P 6/00*   (2016.01)
  *H02P 25/06*   (2016.01)
  *H02P 6/10*   (2006.01)

(52) U.S. Cl.
  CPC ............. *H02P 6/006* (2013.01); *H02P 25/06* (2013.01); *H02P 6/10* (2013.01)

(58) Field of Classification Search
  CPC ............. H02P 6/006; H02P 7/02; H02P 25/06
  See application file for complete search history.

(56) References Cited

U.S. PATENT DOCUMENTS

| 131,322 A | 9/1872 | Anderson |
|---|---|---|
| 2,296,771 A | 9/1942 | Crawford et al. |
| 2,488,287 A | 11/1949 | Goddard |
| 2,511,979 A | 6/1950 | Goddard |
| 2,791,633 A | 9/1956 | Sindzinski |
| 2,956,823 A | 10/1960 | Benjamin, Jr. et al. |
| 3,006,288 A | 10/1961 | Brown |
| 3,083,528 A | 4/1963 | Brown |
| 3,100,454 A | 8/1963 | Dennis |
| 3,132,416 A | 5/1964 | Hait |
| 3,233,559 A | 2/1966 | Smith et al. |
| 3,605,629 A | 9/1971 | Edwards |

(Continued)

FOREIGN PATENT DOCUMENTS

| EP | 2371613 | 10/2011 |
|---|---|---|
| WO | WO2003002370 | 1/2003 |

(Continued)

OTHER PUBLICATIONS

Drives & Controls, Aug. 13, 2013 (Year: 2013).*

(Continued)

*Primary Examiner* — Bickey Dhakal
(74) *Attorney, Agent, or Firm* — Greenblum & Bernstein, P.L.C.

(57) ABSTRACT

A dynamic linear motor is controlled by determining a relative proximity of a moving rotor of the linear motor to a fixed stator segment of the linear motor using a current location of the moving rotor. A current driving characteristic of the linear motor at the current location of the moving rotor is determined. Settings for the fixed stator segment when the moving rotor reaches the fixed stator segment are identified based on the current driving characteristic. The fixed stator segment is driven based on the settings when the moving rotor reaches the fixed stator segment.

9 Claims, 11 Drawing Sheets

(56) References Cited

U.S. PATENT DOCUMENTS

| | | | |
|---|---|---|---|
| 3,610,163 A | 10/1971 | Edwards | |
| 3,738,281 A | 6/1973 | Waidelich | |
| 3,750,803 A | 8/1973 | Paxton | |
| 3,768,417 A | 10/1973 | Thornton et al. | |
| 3,776,141 A | 12/1973 | Gelhard et al. | |
| 3,854,411 A | 12/1974 | Lichtenberg | |
| 3,952,667 A | 4/1976 | Kovanov et al. | |
| 3,954,064 A | 5/1976 | Minovitch | |
| 4,015,540 A | 4/1977 | Roxberry | |
| 4,023,500 A | 5/1977 | Diggs | |
| 4,075,948 A | 2/1978 | Minovitch | |
| 4,108,077 A | 8/1978 | Laing | |
| 4,148,260 A | 4/1979 | Minovitch | |
| 4,175,414 A | 11/1979 | Peytavin | |
| 4,202,272 A | 5/1980 | Teodorescu et al. | |
| 4,276,832 A | 7/1981 | Sika | |
| 4,303,870 A * | 12/1981 | Nakamura | B60L 13/006 104/290 |
| 4,348,618 A * | 9/1982 | Nakamura | B60L 15/005 104/290 |
| 4,400,655 A | 8/1983 | Curtiss et al. | |
| 4,427,740 A | 1/1984 | Stackhouse et al. | |
| 4,603,640 A | 8/1986 | Miller et al. | |
| 4,636,666 A | 1/1987 | Meins | |
| 4,636,667 A | 1/1987 | Holzinger et al. | |
| 4,676,294 A | 6/1987 | Samuelson | |
| 4,718,459 A | 1/1988 | Adorjan | |
| 4,721,045 A * | 1/1988 | Okawa | B60L 15/005 104/290 |
| 4,881,469 A | 11/1989 | Hirtz | |
| 4,955,303 A * | 9/1990 | Ikeda | B60L 13/006 104/292 |
| 5,053,654 A | 10/1991 | Augsburger et al. | |
| 5,136,217 A * | 8/1992 | Hoffmann | B60L 15/005 318/135 |
| 5,237,252 A * | 8/1993 | Tanaka | B60L 15/005 318/587 |
| 5,282,424 A | 2/1994 | O'Neill | |
| 5,388,527 A | 2/1995 | Thornton et al. | |
| 5,619,930 A | 4/1997 | Alimanestiano | |
| 5,676,337 A * | 10/1997 | Giras | B61J 3/02 104/249 |
| 5,712,514 A | 1/1998 | Fischperer et al. | |
| 5,899,635 A | 5/1999 | Kuja et al. | |
| 5,909,367 A | 6/1999 | Change | |
| 5,950,543 A | 9/1999 | Oster | |
| 6,178,892 B1 | 1/2001 | Harding | |
| 6,279,485 B1 | 8/2001 | Schlienger | |
| 6,311,476 B1 | 11/2001 | Frye et al. | |
| 6,373,153 B1 | 4/2002 | Hazelton et al. | |
| 6,374,746 B1 | 4/2002 | Fiske | |
| 6,418,857 B1 | 7/2002 | Okano et al. | |
| 6,502,517 B1 | 1/2003 | Groening et al. | |
| 6,510,799 B2 | 1/2003 | Lamb et al. | |
| 6,584,671 B2 | 7/2003 | Miller et al. | |
| 6,684,794 B2 | 2/2004 | Fiske et al. | |
| 6,876,896 B1 * | 4/2005 | Ortiz | B29C 65/02 318/135 |
| 6,899,036 B2 | 5/2005 | Lamb et al. | |
| 7,096,794 B2 | 8/2006 | Post | |
| 7,114,882 B1 | 10/2006 | Friedmann | |
| 7,204,192 B2 | 4/2007 | Lamb et al. | |
| 7,478,598 B2 | 1/2009 | Post | |
| 7,619,377 B2 * | 11/2009 | Yamada | B60L 13/03 318/135 |
| 7,835,830 B2 | 11/2010 | Ellmann et al. | |
| 7,841,564 B2 | 11/2010 | Ellmann et al. | |
| 7,923,858 B2 | 4/2011 | Ito et al. | |
| 8,006,625 B2 | 8/2011 | Yang | |
| 8,118,266 B2 | 2/2012 | Zheng et al. | |
| 8,171,859 B2 | 5/2012 | Loser et al. | |
| 8,214,957 B2 | 7/2012 | Miettinen | |
| 8,250,990 B2 | 8/2012 | Kunz | |
| 8,281,723 B2 | 10/2012 | Loeser et al. | |
| 8,297,195 B2 | 10/2012 | Loser et al. | |
| 8,402,899 B2 | 3/2013 | Loeser et al. | |
| 8,430,037 B2 | 4/2013 | Miller et al. | |
| 8,430,039 B2 | 4/2013 | Zheng et al. | |
| 8,459,188 B2 | 6/2013 | Miller et al. | |
| 8,468,949 B2 | 6/2013 | Kwon et al. | |
| 8,500,373 B1 | 8/2013 | Epps | |
| 8,534,197 B2 | 9/2013 | Miller | |
| 8,578,860 B2 | 11/2013 | Post | |
| 8,734,139 B2 | 5/2014 | Burns et al. | |
| 8,915,192 B2 | 12/2014 | Zhou | |
| 8,917,086 B2 | 12/2014 | Post | |
| 8,985,030 B2 | 3/2015 | Post | |
| 9,032,880 B2 | 5/2015 | King | |
| 9,085,304 B2 | 7/2015 | Oster | |
| 9,165,461 B1 | 10/2015 | Chu | |
| 9,221,481 B2 | 12/2015 | Desbordes et al. | |
| 9,228,298 B2 | 1/2016 | Oster | |
| 9,254,759 B1 | 2/2016 | Henderson et al. | |
| 9,290,187 B2 | 3/2016 | Dalrymple | |
| 9,290,278 B2 | 3/2016 | Dillon | |
| 9,302,577 B2 | 4/2016 | Catalan | |
| 2001/0037747 A1 | 11/2001 | Svensson | |
| 2002/0047314 A1 * | 4/2002 | Takedomi | H02K 41/03 310/12.23 |
| 2002/0197135 A1 | 12/2002 | Arntzen et al. | |
| 2003/0205163 A1 | 11/2003 | Lamb et al. | |
| 2004/0056538 A1 | 3/2004 | Du et al. | |
| 2004/0139723 A1 | 7/2004 | Parkin | |
| 2004/0144086 A1 | 7/2004 | Wollenweber | |
| 2004/0155031 A1 | 8/2004 | Toyooka et al. | |
| 2004/0188650 A1 | 9/2004 | Nalini | |
| 2005/0073269 A1 * | 4/2005 | Lewis | H02P 25/06 318/135 |
| 2005/0076802 A1 | 4/2005 | Pullium | |
| 2005/0248321 A1 | 11/2005 | Liu et al. | |
| 2006/0032063 A1 | 2/2006 | Tomasello et al. | |
| 2006/0091347 A1 | 5/2006 | McGuire | |
| 2006/0150858 A1 | 7/2006 | Appleton | |
| 2006/0023616 A1 | 10/2006 | Friedmann | |
| 2006/0235589 A1 | 10/2006 | Deng et al. | |
| 2006/0236890 A1 | 10/2006 | Lamb et al. | |
| 2007/0187556 A1 | 8/2007 | Yoshitake | |
| 2007/0192000 A1 | 8/2007 | Ellmann et al. | |
| 2007/0214994 A1 | 9/2007 | Ardente | |
| 2008/0236973 A1 | 10/2008 | Hahn et al. | |
| 2008/0275572 A1 | 11/2008 | Tillotson | |
| 2008/0277534 A1 | 11/2008 | Ellmann et al. | |
| 2009/0101040 A1 | 4/2009 | Yang | |
| 2009/0158955 A1 | 6/2009 | Pulliam | |
| 2010/0005997 A1 | 1/2010 | Tozonl | |
| 2010/0031846 A1 | 2/2010 | Loser et al. | |
| 2010/0083864 A1 | 4/2010 | Flynn | |
| 2010/0092243 A1 | 4/2010 | Bauder | |
| 2010/0115947 A1 | 5/2010 | Galbraith | |
| 2010/0143044 A1 | 6/2010 | Kadaster et al. | |
| 2010/0183407 A1 | 7/2010 | Kim | |
| 2010/0192799 A1 | 8/2010 | Miller | |
| 2010/0320949 A1 * | 12/2010 | Fotherby | H02M 7/48 318/400.26 |
| 2011/0042592 A1 | 2/2011 | Elliott | |
| 2011/0156619 A1 | 6/2011 | Nomura | |
| 2011/0226151 A1 | 9/2011 | Pumpelly | |
| 2011/0226764 A1 | 9/2011 | Smith et al. | |
| 2011/0283914 A1 | 11/2011 | Kwon et al. | |
| 2012/0019235 A1 | 1/2012 | Post | |
| 2012/0089525 A1 | 4/2012 | Kley et al. | |
| 2012/0153744 A1 | 6/2012 | Criswell et al. | |
| 2012/0174901 A1 | 7/2012 | Post | |
| 2012/0285575 A1 | 11/2012 | Catha | |
| 2012/0292993 A1 | 11/2012 | Mettler et al. | |
| 2012/0299684 A1 | 11/2012 | Won | |
| 2013/0025493 A1 | 1/2013 | Friedmann | |
| 2013/0059182 A1 | 3/2013 | Komatsu et al. | |
| 2013/0125779 A1 | 5/2013 | DeMatias | |
| 2013/0136546 A1 | 5/2013 | Friedmann | |
| 2013/0167752 A1 * | 7/2013 | Barbee | B61C 3/02 105/1.4 |
| 2013/0174757 A1 | 7/2013 | Post | |

(56) References Cited

U.S. PATENT DOCUMENTS

| | | |
|---|---|---|
| 2013/0229134 A1 | 9/2013 | Sato |
| 2013/0276665 A1 | 10/2013 | Dalrymple |
| 2014/0000473 A1 | 1/2014 | Miller |
| 2014/0116406 A1 | 5/2014 | Post |
| 2014/0261054 A1 | 9/2014 | Oster |
| 2014/0261055 A1 | 9/2014 | Oster |
| 2014/0354064 A1 | 12/2014 | Tseliakhovich |
| 2015/0091478 A1* | 4/2015 | Marzano .......... B60L 7/28 318/135 |
| 2016/0009196 A1 | 1/2016 | Allard |
| 2016/0023668 A1 | 1/2016 | Shetty |
| 2016/0033970 A1 | 2/2016 | Henderson et al. |
| 2016/0059868 A1 | 3/2016 | Allaire |
| 2016/0229297 A1 | 8/2016 | Finodeyev et al. |
| 2016/0229416 A1 | 8/2016 | Bambrogan et al. |
| 2016/0229417 A1 | 8/2016 | Bambrogan et al. |
| 2016/0229418 A1 | 8/2016 | Bambrogan et al. |
| 2016/0229419 A1 | 8/2016 | Bambrogan et al. |
| 2016/0229420 A1 | 8/2016 | Coutre et al. |
| 2016/0229427 A1 | 8/2016 | Avetian et al. |
| 2016/0229646 A1 | 8/2016 | Bambrogan et al. |
| 2016/0230350 A1 | 8/2016 | Bambrogan et al. |
| 2016/0230768 A1 | 8/2016 | Bambrogan et al. |
| 2016/0230899 A1 | 8/2016 | Cothern et al. |
| 2016/0230915 A1 | 8/2016 | Cothern et al. |
| 2016/0233754 A1 | 8/2016 | Dorris et al. |
| 2016/0233809 A1 | 8/2016 | Jetti |

FOREIGN PATENT DOCUMENTS

| | | |
|---|---|---|
| WO | WO2003003389 | 1/2003 |
| WO | WO2007087028 | 8/2007 |
| WO | WO2009/135389 | 11/2009 |

OTHER PUBLICATIONS

Musk, E., "Hyperloop White Paper," dated Aug. 12, 2013.
Wright, I., "Engineering the Hyperloop: Testing 4 Core Elements," dated Feb. 16, 2016.
Protalinski, E., "Hyperloop's intro video claims the future is now," dated Sep. 17, 2015.
GNB Corporation Product Catalog, 20 pages, (Mar. 14, 2013).
Khatait, J., et al., "Design and development of orifice-type aerostatic thrust bearing," SIMTech technical reports, vol. 6, No. 1 (Jan. 2005).
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
Barboza, D., "A New Port in Shanghai, 20 Miles Out to Sea," The New York Times, Dec. 12, 2005.
Thornton. R., "The Future of Maglev," Magnemotion, Nov. 5, 2007.
International Search Report conducted in counterpart Int'l. Appln. No. PCT/US2016/059551 (dated Mar. 3, 2017).
India Office Action conducted in counterpart India Appln. No. 201847014756 (dated Jul. 23, 2020).

\* cited by examiner

VARIABLE FREQUENCY DRIVE SYSTEM

CROSS REFERENCE TO RELATED APPLICATION

The present application claims the benefit of U.S. Provisional Patent Application No. 62/247,954, filed on Oct. 29, 2015, the disclosure of which is expressly incorporated by reference herein in its entireties.

BACKGROUND

1. Field of the Disclosure

The present disclosure relates to the field of energy supply systems. More particularly, the present disclosure relates to energy supply for motor drive systems.

2. Background Information

A linear motor is an electric motor that has had its stator and rotor "unrolled" so that instead of producing torque, it produces a linear force along its length. This can be useful for a variety of purposes including for powering a transportation system.

Separately, energy supplied from the power grid has traditionally been provided via isolation transformers to a variable frequency converter. The converter converts voltage and current from the power grid's parameters to the destination's parameters, and also provides the necessary function of isolating the destination from the power grid. Additionally, a separate energy storage system is required when using a cascaded H-bridge converter. Configurations of cascaded H-bridge converters with an integrated energy storage (e.g., battery) connected to each converter can be prohibitively expensive, and are not particularly reliable when used in pulse power applications and/or a harsh environment.

A transportation system can operate by providing external power (e.g., from energy storage systems or the power grid) to vehicles using a linear motor to propel vehicles along tracks. For a transportation system such as a commuter rail system, external power can be supplied to the entire transportation system continuously.

BRIEF DESCRIPTION OF THE DRAWINGS

The novel features which are characteristic of the present systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

A high-speed transportation system can use a low pressure environment in a tube in order to reduce drag on a vehicle at high operating speeds. The transportation system could benefit from both a greater speed potential and lowered energy costs, both resulting from reducing drag. Such a system could use a near vacuum within a tubular structure. The inventors of the technology and inventions described herein are involved in building and fully implementing such a transportation system.

A variable frequency drive system for a motor drive system is described herein, and can be used to implement a high-speed transportation system. The disclosure herein also provides for a converter system that drives a linear motor and interfaces with a hybrid energy supply system and/or energy source (including the power grid). The variable frequency drive system and converter system may be provided as separate systems, or may be integrated together as a single system.

Figure 1:
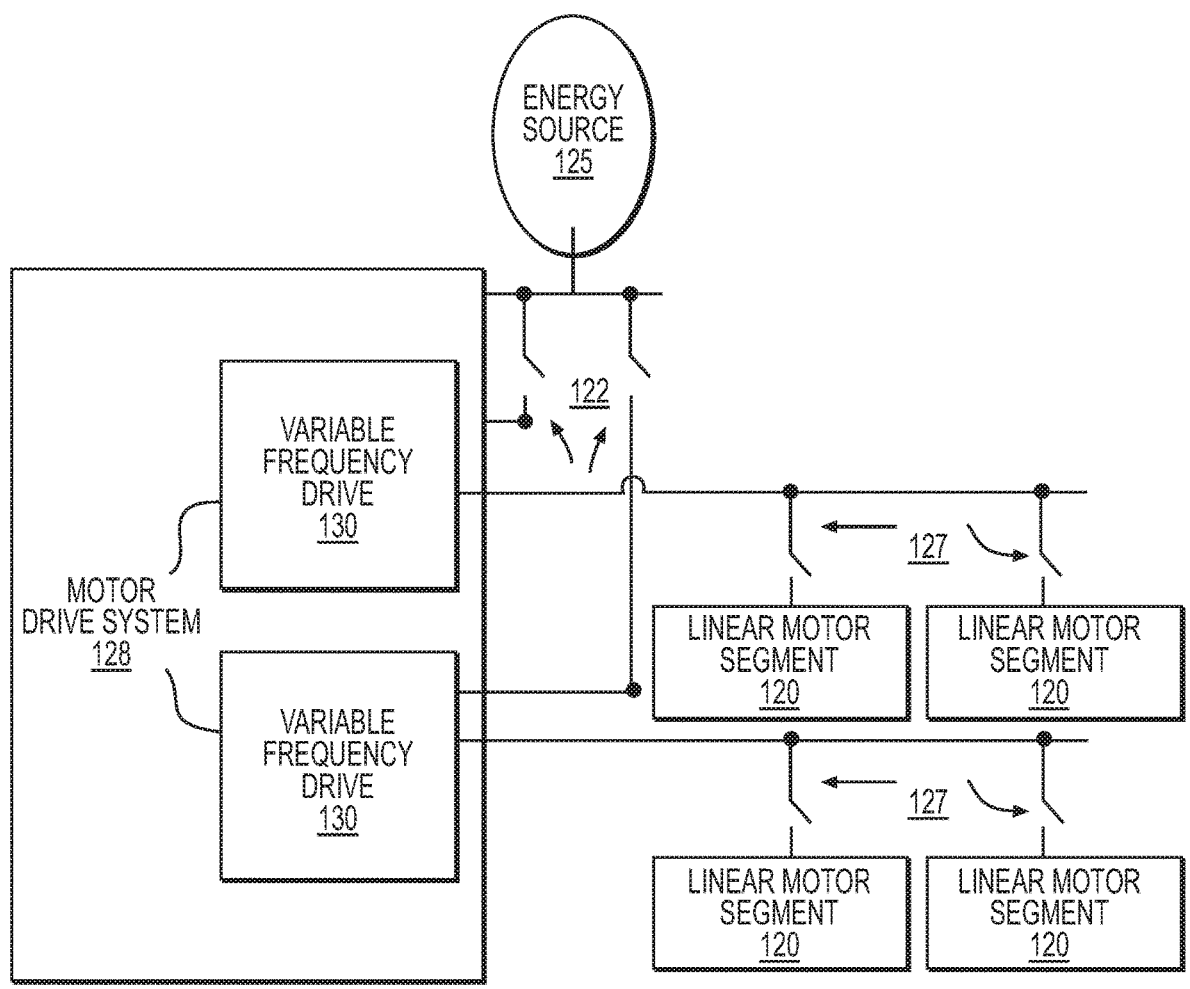
FIG. 1 is a diagram of a motor drive system for a linear motor, according to an aspect of the present disclosure.

FIG. 1 is a diagram of a motor drive system for a linear motor, according to an aspect of the present disclosure. In FIG. 1, a medium-voltage (defined hereinafter) motor drive system 128 is provided as a system via variable frequency drives 130. Each variable frequency drive 130 is comprised of one or more energy cells (not shown in FIG. 1). An ultracapacitor is an example of an energy storage module contemplated by the described embodiments, as is a flywheel, batteries and/or other forms of energy storage devices, and these modules/devices can be provided as part of variable frequency drive 130 in motor drive system 128.

Each variable frequency drive 130 is connected to and disconnected from an external energy source 125 via at least one first switching element (switch) 122 and is also connected to and disconnected from linear motor segments 120 via at least one second switching element (switch) 127. In FIG. 1, multiple variable frequency drives 130 are shown. As can be easily envisioned, for a transportation system spanning dozens or hundreds of miles, numerous such variable frequency drives 130 can be used to form a motor drive system 128. Additionally, while only a single energy source 125 is shown in FIG. 1, variable frequency drives 130 may be connected to any number and different types of energy sources 125 such as, e.g., the power grid, renewable sources, combustion engines, additional energy storage, and so on.

External energy source 125 may be different power and voltage than the desired output for motor drives with energy storage 130. Voltage provided from the energy source 125 to the variable frequency drives 130 is drawn through the respective first switching elements 122.

The peak power resulting from an energy source 125 through the first switching elements 122 to the motor drives with energy storage 130 described herein is lower than in a conventional system because the energy can be drawn steadily from the source. Accordingly, the cost of using an array of first switching elements 122 is lower than conventional alternatives.

To charge variable frequency drive 130, e.g., one or more ultracapacitors or flywheels (or other energy storage devices), subsets of ultracapacitors or flywheels, or all ultracapacitors or flywheels, embedded in a motor drive system 128 formed by the variable frequency drives 130, a motor drive system 128 is first disconnected from all the linear motor segments 120 via the second switching elements 127, and then connected to the energy source 125 via the first switching elements 122. In embodiments, it is also contemplated that the above-noted variable frequency drives 130 can be discharged through first switching elements 122 to generate power to external energy source 125. To drive or brake a linear motor formed by the linear motor segments 120, the variable frequency drives 130 are first disconnected from the energy source 125, and then connected to the linear motor segments 120 via the second switching elements 127. The energy stored in the ultracapacitor(s), flywheels or other energy storage devices of the variable frequency drives 130 is used to drive or brake the linear motor formed by the linear motor segments 120. Power provided to and drawn from the energy storage devices of variable frequency drives 130 is provided and drawn via converter module 233. In an alternative, it is also contemplated that power from external energy source 125 can be continuously flowing to variable frequency drives 130, whereby the energy cell 228 isolate external energy source 125 from linear motor segments 120 via the converter module 233 so that the need for first switches 122 to operate to charge/discharge the energy storage devices can be eliminated.

Figure 13:
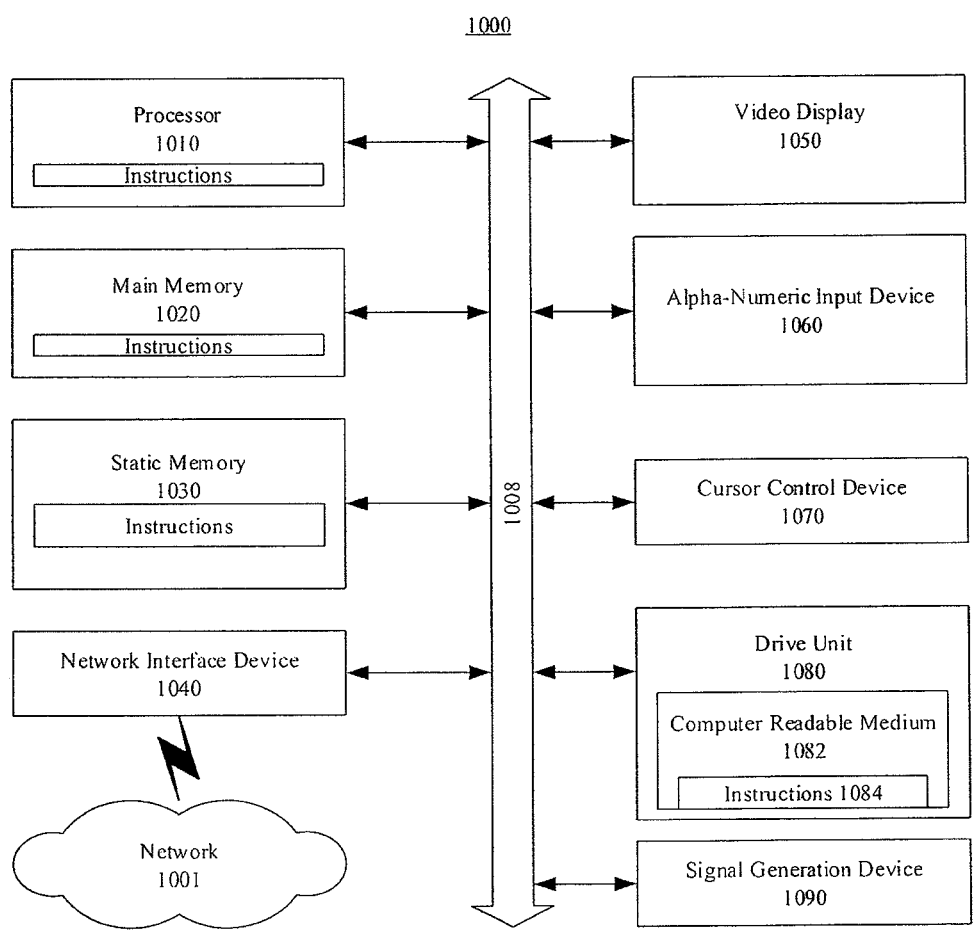
FIG. 13 is an exemplary general computer system that includes a set of instructions for a variable frequency drive system, according to an aspect of the present disclosure.

The linear motor segments 120 are discussed below, but as a contextual introduction, the linear motor segments 120 are stator segments of the linear motor. The rotor of the linear motor may be carried by a vehicle (pod or capsule) that travels through a tube in which the linear motor/linear motor segments are arranged. The linear motor segments 120 can be individually dynamically powered in synchronization with the approaching and departing vehicle (pod). The synchronization can be performed by using a computer as shown in FIG. 13, or using sensors distributed along a tube such as tube 700 in FIG. 10a. Such sensors can include position/motion sensors and velocity sensors. Although multiple variable frequency drives 130 are combined to form a motor drive system 128, they are not necessarily connected, electrically or mechanically. Each variable frequency drive 130 may be connected to and power, simultaneously or individually via switches, multiple linear motor segments 120. For instance, a first variable frequency drive 130 may activate a first linear motor segment 120 as a rotor interacts with the linear motor segment 120. A variable frequency drive 130 may activate a second linear motor segment 120 as the rotor moves from the first linear motor segment to the second linear motor segment. This may occur without any communication, electrical or mechanical, between the first and second variable frequency drives and without any communication, electrical or mechanical, between the first and second linear motor segment.

Figure 2:
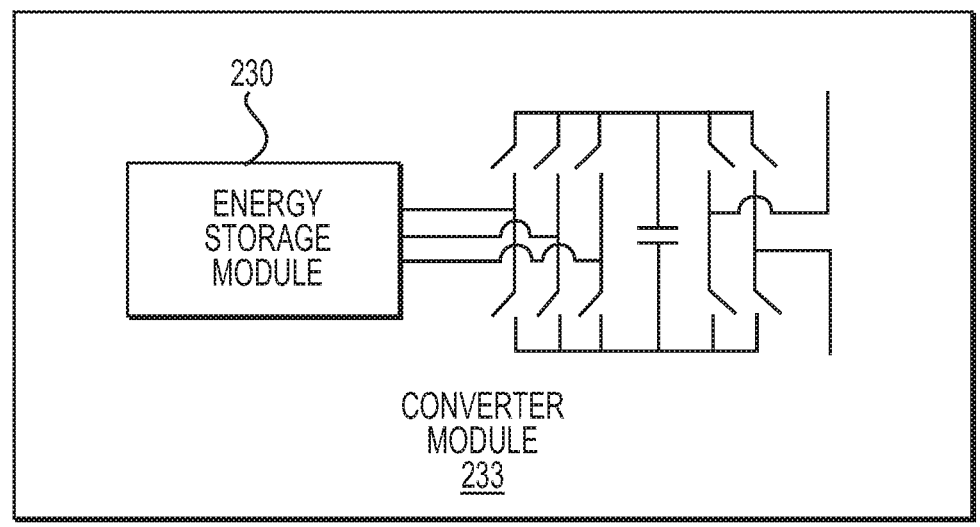
FIG. 2 is a diagram of an embodiment of an energy cell of a motor drive system for a linear motor, according to an aspect of the present disclosure.

FIG. 2 is a diagram of an energy cell 228 for a variable frequency drive 130, according to an aspect of the present disclosure. In FIG. 2, the energy cell 228 includes a converter module 233 and an energy storage module 230. The energy storage module 230 can include, e.g., at least one ultracapacitor, at least one flywheel with an associated motor and/or other energy storage device(s), which can be connected to a converter module 233 to convert relatively low-voltage power supplied by energy storage module 230, approximately 1.2 kV, to a relatively higher (as compared to the low-voltage power) medium-voltage, approximately 13.8 kV, that can be applied to a linear motor, e.g., linear motor segments 120 (see FIG. 1). Thus, the converter module 233 provides power of sufficient voltage to drive linear motor segments 120. The converter module 233 may also function to reduce the voltage coming from energy source 125, which could be in excess of 100 kV, such as through pulse conversion. It may also switch the electrical polarity of the circuit. It may also smooth the output voltage by drawing from or to an integrated capacitor if the incoming voltage is not steady. The converter may also function to short the circuit as an emergency cut off. In the illustrated embodiment, energy storage module 230 can output single phase (solid line) or multiphase voltage power (solid and dashed lines) to respective switches of voltage converter module 233 to convert the single phase or multiphase low voltage power to the desired medium voltage power.

Figure 3:
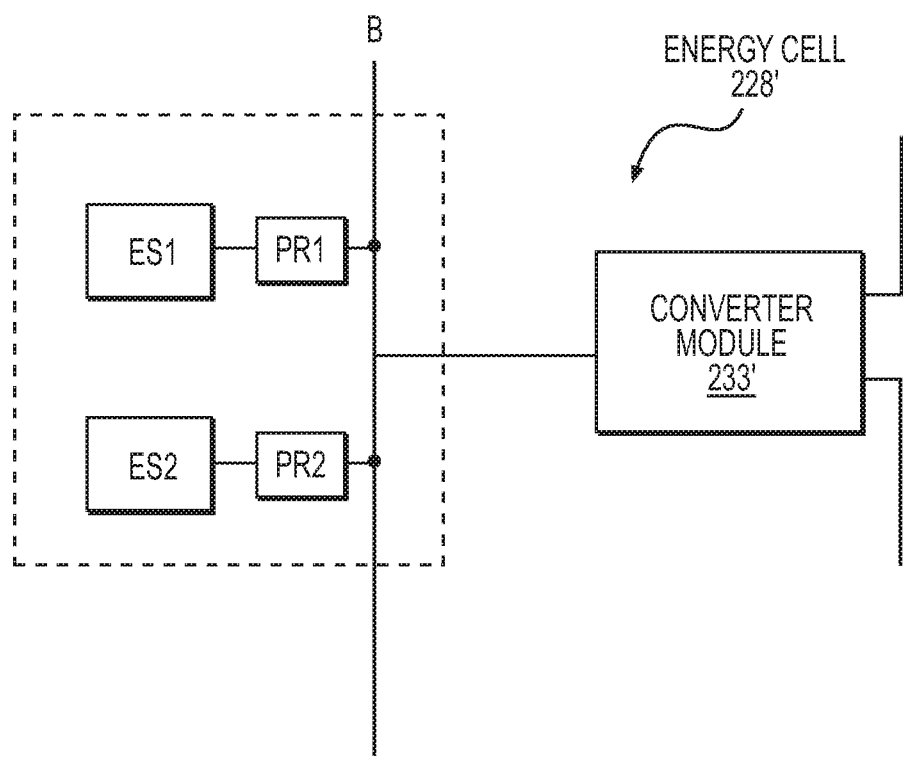
FIG. 3 is a diagram of another embodiment of an energy cell of a motor drive system for a linear motor, according to an aspect of the present disclosure.

In a further embodiment of motor drive component of an energy cell 228' illustrated in FIG. 3, more than one energy storage module ES1, ES2 can be connected in parallel to a common bus B via protective devices PR1, PR2, respectively, which can be switches or fuses. Bus B can be connected to converter module 233' in such a manner that one or more phases from energy storage modules ES1, ES2 are converted from a single phase to multiphase low-voltage power to a medium-voltage for connection to the linear motor segments 120.

Figure 4:
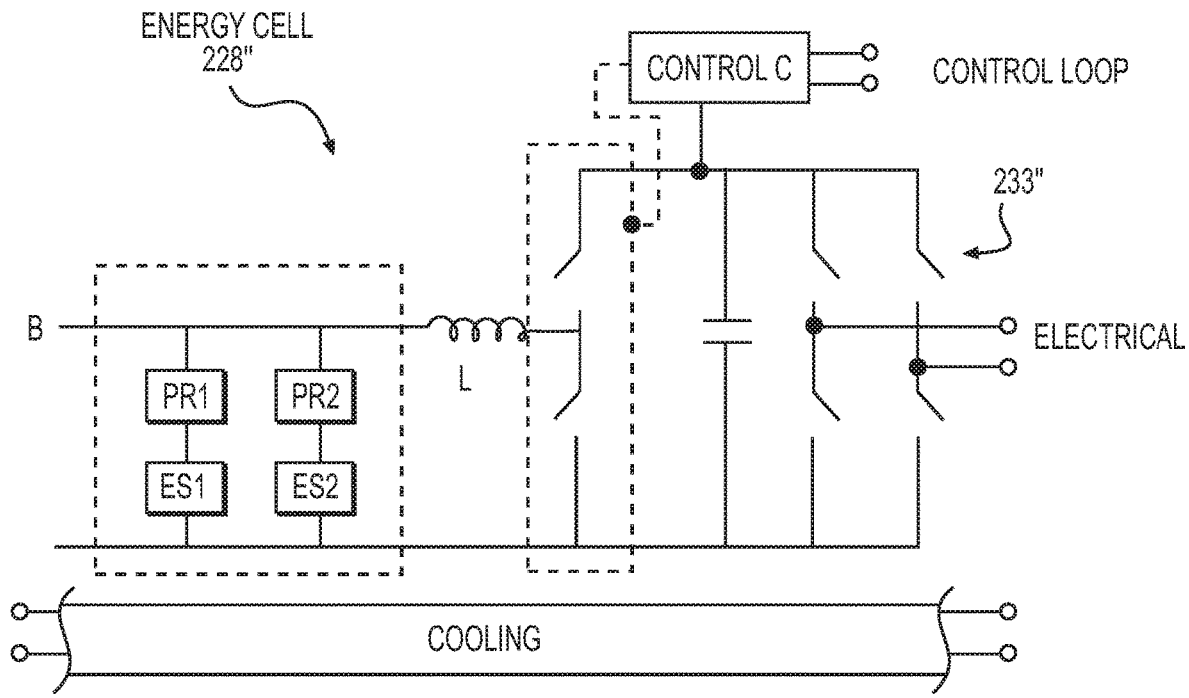
FIG. 4 is a diagram of another embodiment of an energy cell of a motor drive system for a linear motor, according to an aspect of the present disclosure.

In still another embodiment of an energy cell 228" illustrated in FIG. 4, more than one energy storage module ES1, ES2 can be arranged in parallel to connect to a common bus B through respective protective devices PR1, PR2. An inductor L can be connected between bus B to combine multiple phases of the parallel energy storage devices ES1, ES2 into one terminal of converter module 233", thus eliminating the need for separate switches for each phase. FIG. 4 further shows a control device C connected to converter module 233" to control the operation of the switches that inputs the low voltage power into the converter module 233". Further control device C can be connected, e.g., via optical fiber to a central control unit (not shown) that monitors and controls all control devices C connected as part of a control loop of the system. FIG. 4 also schematically illustrates a cooling device, which can run along the entire system or along discrete portions of the system, i.e., where needed, to prevent overheating of the components.

Figure 5:
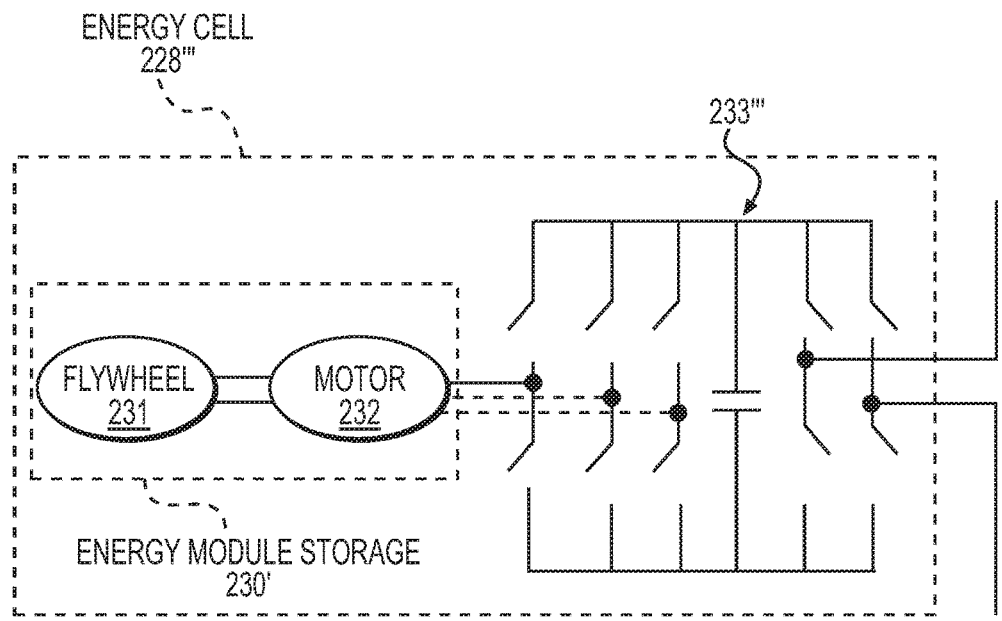
FIG. 5 is a diagram of still another embodiment of an energy cell of a motor drive system for a linear motor, according to an aspect of the present disclosure.

In an alternative embodiment of an energy cell 228' illustrated in FIG. 5, when energy storage module 230' includes a flywheel 231, an associated motor 232 for charging the flywheel can be connected between the flywheel and converter module 233', as shown in FIG. 5, so that the three phases of the associated motor 232 of flywheel 231 are connected to converter module 233. The three-phase converter module 233 converts the three-phase low-voltage power from the flywheel energy storage module to the desired medium-voltage to be applied to linear motor segments 120.

In embodiments, energy cell 228 may be a variable frequency drives 130 so that multiple low-voltage energy cells 228 may be combined together to form the desired medium-voltage motor drive to supply the desired medium voltage power to linear motor segments 120. Using the converter module 233, low-voltage stored in the ultracapacitor 231 can be converted to a higher voltage used to drive the linear motor as described herein.

Figure 10A:
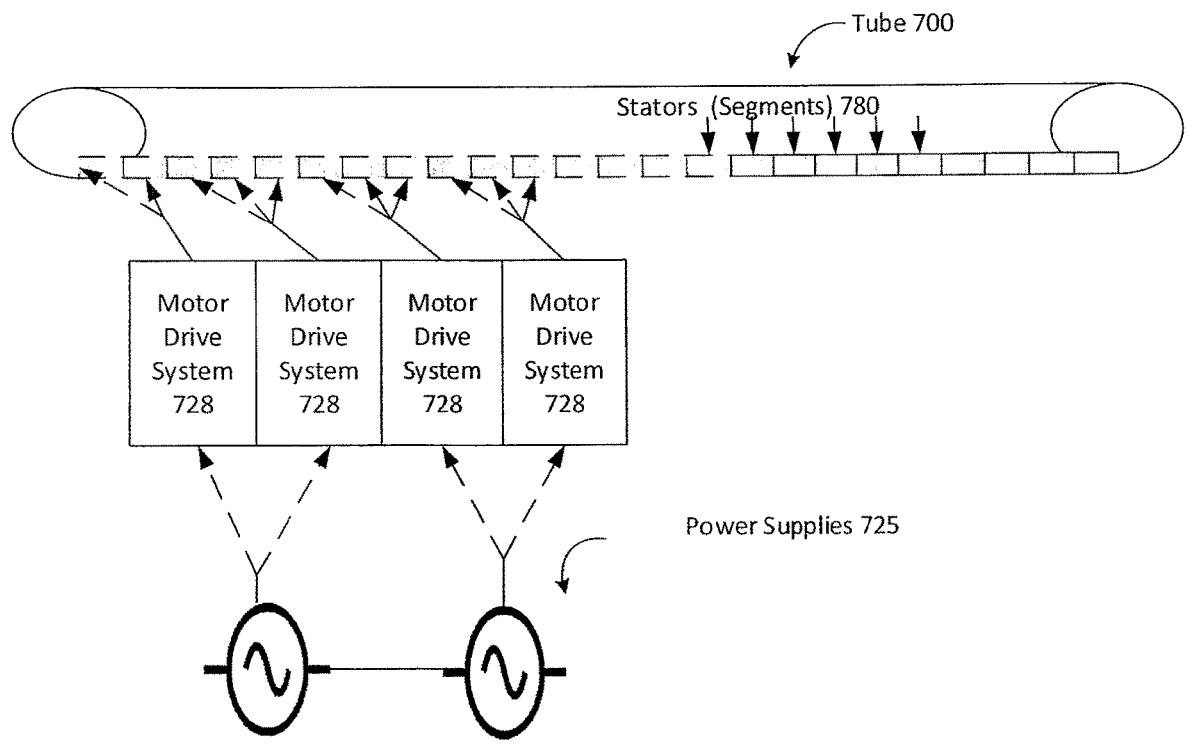
FIG. 10a is a view of a transportation system that includes a motor drive system for a linear motor, according to an aspect of the present disclosure.

Additionally, the acts of storing energy in energy storage module 230 (ES1, ES2) and providing energy from energy storage module 230 (ES1, ES2) may be synchronized by a coordinating computer (see FIG. 13) and/or sensors distributed along a tube (see FIG. 10a). In this way, numerous motor drive systems 228 may be used to coordinate power supply to multiple different linear motor segments 120. One example of such coordination is disclosed in commonly-assigned U.S. patent application Ser. No. 15/008,024, filed on Jan. 27, 2016 and entitled "Dynamic Linear Stator Segment Control", the entire contents of which are expressly incorporated by reference herein in their entireties.

Figure 6:
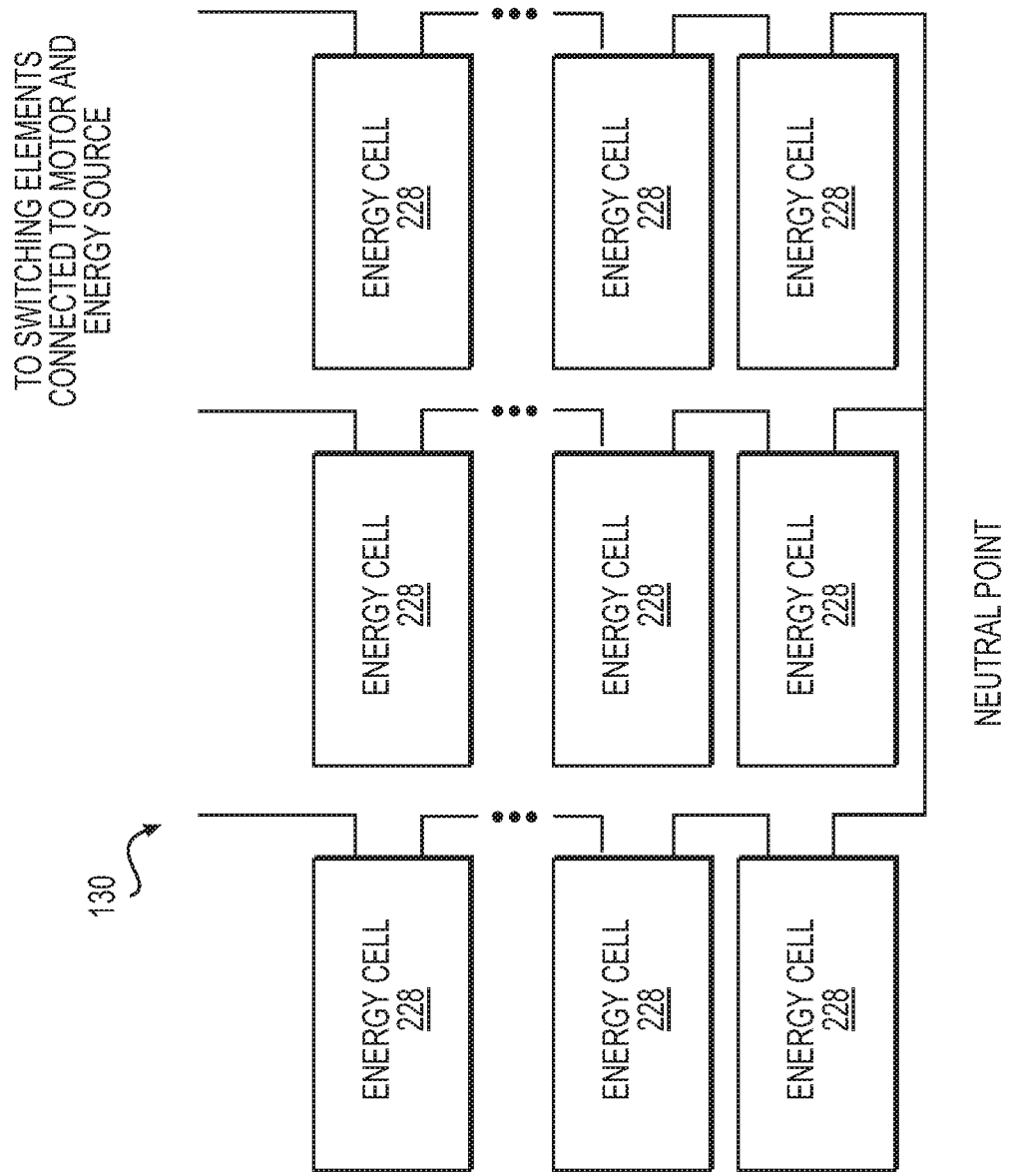
FIG. 6 is a diagram of a Wye configuration for an energy cell of a motor drive system for a linear motor, according to an aspect of the present disclosure.

FIG. 6 is a diagram of a Wye configuration for energy cells 228 to form a variable frequency drive 130, according to an aspect of the present disclosure. In a symmetric three-phase power supply system, alternating current (AC) of the same frequency and voltage amplitude is carried by three conductors, each with a phase difference of one third. The voltage on any conductor reaches a peak at one third of a cycle after one of the other conductors and one third of a cycle before the remaining conductor, due to the phase difference. This phase delay gives constant power transfer to a balanced linear load, and allows production of a rotating magnetic field in an electric motor. Three-phase electric power is commonly used for alternating-current power transfer, including for large motors such as would be used with a large transportation system.

In the embodiment of FIG. 6, nine energy cells 228, each comprising an energy storage (ES) module 230 and a converter module 233, are arrayed in a Wye configuration in groups of three. The energy cells 228 in each group are arranged in series so that a line out from each group leads to switching elements connected to a linear motor and/or energy source. In the Wye configuration, each group is also connected by a transformer to a common neutral point.

Figure 7:
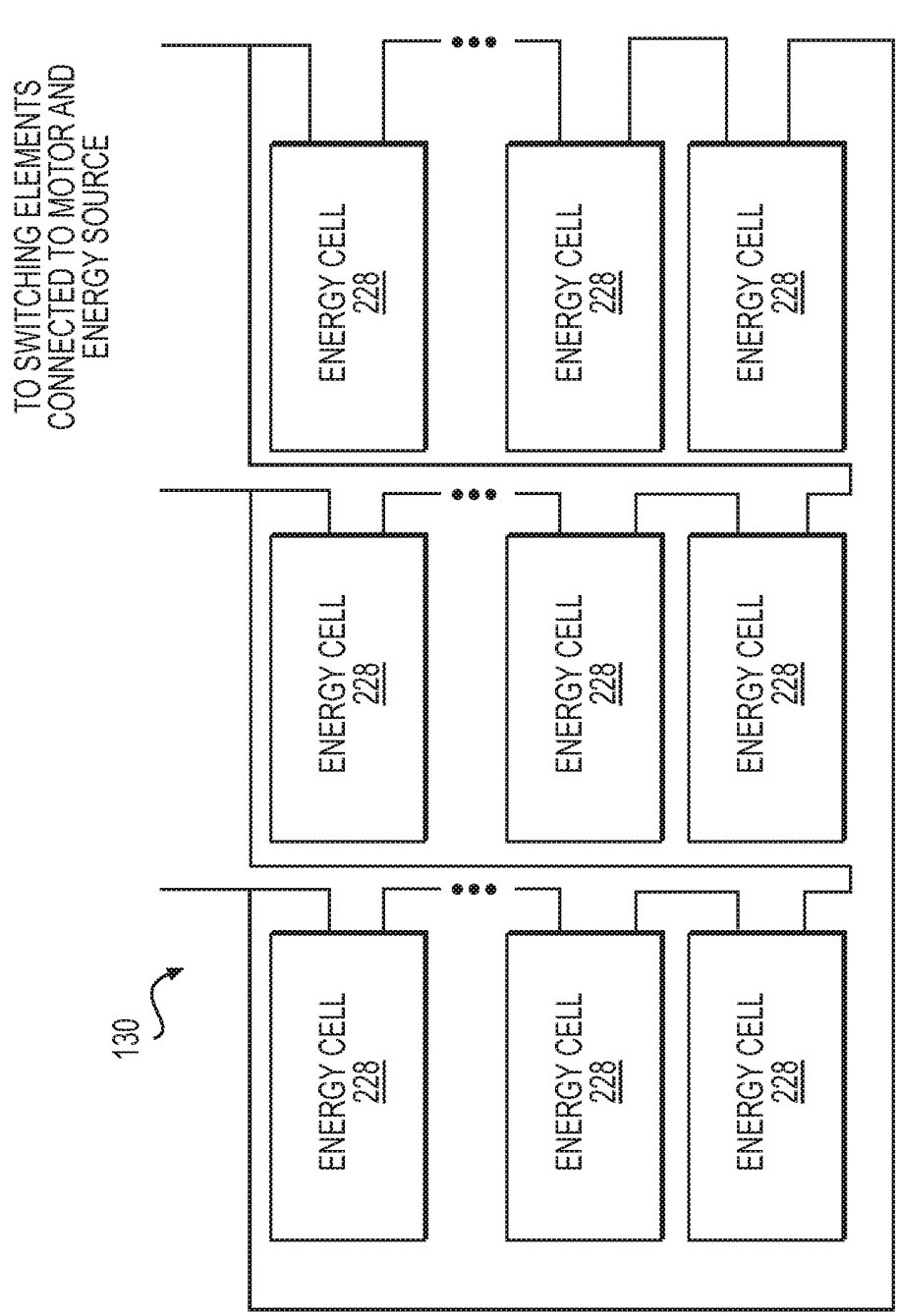
FIG. 7 is a diagram of a Delta configuration for an energy cell of a motor drive system for a linear motor, according to an aspect of the present disclosure.

FIG. 7 is a diagram of a Delta configuration for energy cells 228 of a variable frequency drive 130, according to an aspect of the present disclosure. In the Delta configuration, nine energy cells 228, each comprising an energy storage (ES) module 230 and a converter module 233, are again arranged in groups of three, but in FIG. 7 each line out to switching elements connected to linear motor and/or energy source leads out from two of the three groups.

Figure 8:
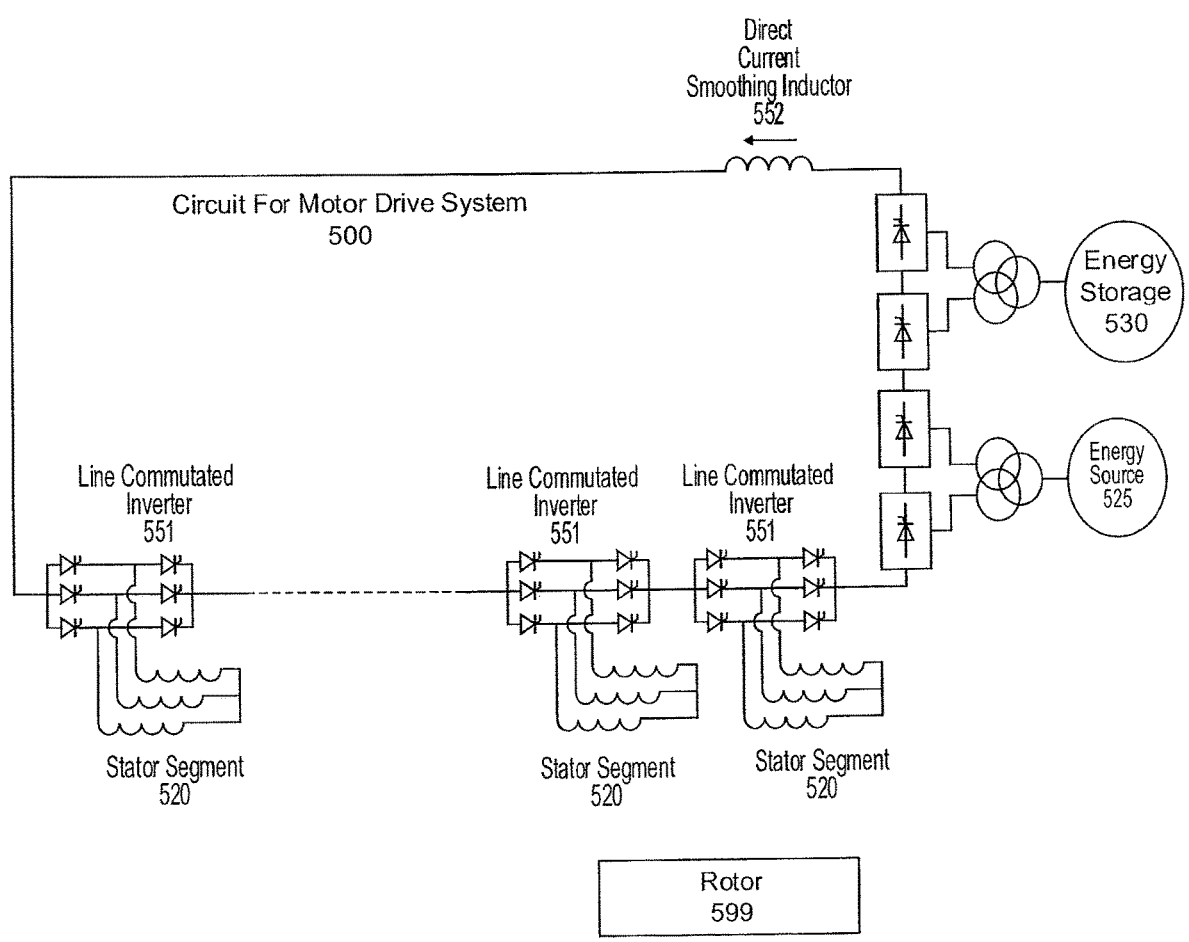
FIG. 8 is a diagram of a system that includes a circuit for a variable frequency drive system, according to an aspect of the present disclosure.
Figure 9:
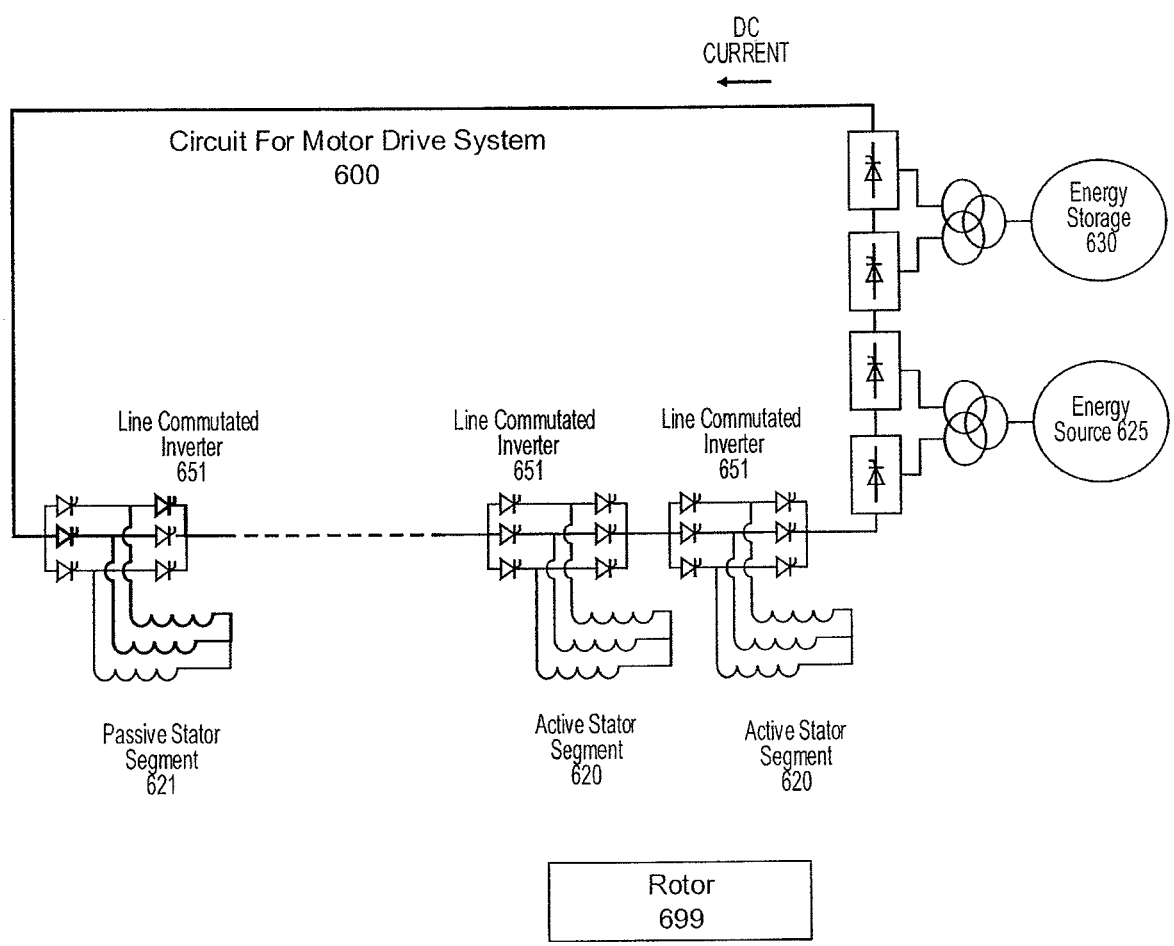
FIG. 9 is a diagram of a system that includes a circuit for a variable frequency drive system, according to an aspect of the present disclosure.

FIGS. 8 and 9 are diagrams of circuits for a motor drive system for a linear motor, according to an aspect of the present disclosure. In FIG. 8, multiple line commutated inverters (LCIS) 551 are distributed along linear motor stator segments 520. In FIG. 9, multiple line commutated inverters 651 are similarly distributed along linear motor stator segments. The line commutated inverters 551 and 651 are not all identical, as 3-phase line commutated inverters 551, 651 are connected to stator segments 520, 620, while 1-phase line commutated inverters 551, 651 are connected to energy storage module 530, 630 and/or energy sources 525, 625. Line commutated inverters are circuit elements that translate direct current in a circuit path into alternating current that can be provided to additional elements. In FIGS. 8 and 9, the additional elements include energy storage module 530, 630, energy sources 525, 625, stator segments 520, 620, and so on. As an analogy, if the circuits 500 and 600 are considered analogous to highways along which direct current travels, the line commutated inverters 551, 651 could be considered analogous to entrances and exits by which energy can enter and exit the circuits.

The alternating current (AC) sides of three line commutated inverter 551 in FIG. 8 connect to a linear motor stator segment 520. The direct current (DC) sides of all line commutated inverters 551 in the circuit 500 are connected in series. The line commutated inverters 551 in FIG. 8 include the three at the bottom connected to stator segments 520, and also additional line commutated inverters that connect to an energy storage module 530 (for example, ultracapacitor, flywheel, etc.), and an energy source 525 (for example, the grid, renewable generation, a combustion engine generator).

Additionally, a smoothing inductor 552 can be used to smooth the direct current in the circuit 500. Direct current in the direct current smoothing inductor 552 is built up by converting energy that enters the circuit 500 from the energy source 525 and/or from the energy storage 530 via the respective line commutated inverters 551. The direct current can also be used to charge or discharge the energy storage module 530 via the corresponding line commutated inverter 551.

In FIG. 8 and FIG. 9, as a rotor 599 or 699 travels, nearby or approaching linear motor stator segments 520 or 620 are activated, and other linear motor stator segments 520 or 620 (e.g., remote from the rotor location) may remain passive (i.e., deactivated). The line commutated inverters 551 or 651 that are connected to the active stator segments 520 or 620 commutate the direct current from the circuit 500, 600 sequentially into each phase of the coils of the active stator segments 520 or 620. In this way, a moving flux is formed. The moving flux drives the rotor 599 or 699. The line commutated inverters 551, 651 that are connected to the passive stator segments 520 or 620 are controlled to bypass the DC current by turning on thyristors in one or more phases.

The embodiments of FIGS. 8 and 9 can provide power at lower cost than conventional voltage source converters for several reasons, including cheaper component manufacturing costs. This also reduces cabling necessary along the linear motor stator segments 520, 620. Only direct current cables of two polarities may be required, compared to a multitude of 3-phase alternating current cables that would be required in an alternative using a central converter with segment switches instead of the direct current cables and line commutated inverters 551, 651.

In an embodiment, a direct current inductor can be implemented using the coils of the passive stator segments 620 which are not being actively driven. In this way, instead of bypassing the line commutated inverters 651 for the passive stator segments 620, selected thyristors can be turned on so that the coils of the passive stator segments 620 are connected in the direct current loop of the circuit 600. The coils of the passive stator segments 620 then provide direct current inductance for the active line commutated inverters 551.

In another embodiment, distributed line commutated inverters 551, 651 may be connected to multi-phase linear motors so as to reduce torque ripples. Each distributed line commutated inverter 551, 651 has multiple phase legs as shown, and adjacent line commutated inverters 551, 651 can be operated with phase shifts.

In FIG. 9, two of three stator segments 620 are labeled active, and one stator segment 621 is labeled passive. This shows how specific stator segments 620 can be selectively driven as a rotor 699 approaches, while other stator segments 620 remain passive.

Figure 10B:
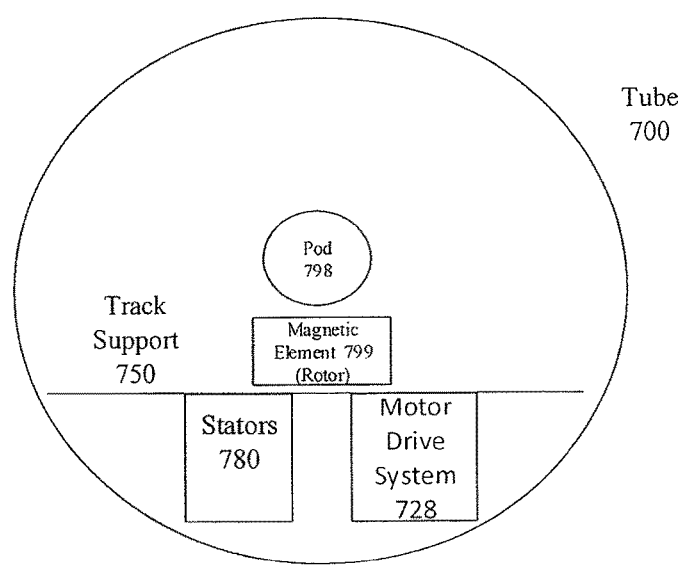
FIG. 10b is a frontal schematic view of a transportation system that includes a motor drive system for a linear motor, according to an aspect of the present disclosure.

FIG. 10a is a view of a transportation system that includes a motor drive system for a linear motor, according to an aspect of the present disclosure, and FIG. 10b is a frontal schematic view of the transportation system for a hybrid energy supply system, according to an aspect of the present disclosure. Tube 700 can be, e.g., a subway tunnel, or a tube within which transportation pods can travel. As such, the tube 700 may be dozens or even hundreds of kilometers long, and on the order of 25-250 feet in diameter. Additionally, the tube 700 may have a circular profile, but the profile of the tube 700 may also be in other shapes such as an ellipse or a rectangle. One example of such a system is disclosed in commonly-assigned U.S. patent application Ser. No. 15/007,783, entitled "Transportation System", the entire contents of which are expressly incorporated by reference herein in their entirety.

An electromagnetic system powers pods 798 that move through the tube 700. The electromagnetic system may include magnets 799 provided on each pod 798 serving as rotors. The electromagnetic system also includes aligned stator segments 780 placed in portions of the tube where the pods 798 are to be accelerated. The aligned stator segments 780 may include interlocked blocks of windings as described in commonly-assigned U.S. patent application Ser. No. 15/007,940, filed on Jan. 27, 2016 and entitled "Continuous Winding for Electric Motors", the entire contents of which are expressly incorporated by reference herein in their entirety.

The electromagnetic system works as a linear motor to generate a force that is proportional to both the current running through the stator segments 780 and the magnetic field of the rotor carried by the pod 798. The force itself is produced by induction which produces a magnetic field opposite to the magnetic field of the rotor 799. The opposing fields repel each other, and these forces act to propel the pod 798 and rotor 799 through the tube 700.

The tube 700 may be depressurized (vacuumed) in a way that reduces resistance encountered by the pods 798 as they move through the tube 700. In this way, pods 798 may achieve faster speeds or the same speed with less power, using the electromagnetic system that includes the aligned stator segments 780 and the rotors 799 carried by the pods 798. That is, pods 798 will require less propulsion force to obtain a given speed using the electromagnetic system that includes the aligned stator segments 780 and the rotors 799 carried by the pods 798.

Motor drive systems 728 apply voltage to the stator segments 780. Each motor drive system 728 provides power to a subset of the stator segments 780. Each motor drive system 728 is a medium-voltage motor drive such as the medium-voltage motor drive system 128 shown in FIG. 1. Further, each motor drive system 728 can include one or more energy storage modules such as ultracapacitors 231, flywheels and/or other storage devices, as illustrated and described with reference to FIG. 2. The energy storage module of the motor drive system 728 serves as energy storage in a hybrid energy supply system that collects energy from energy sources/power supplies 725 and provides energy through a low-voltage converter (not shown) when the motor drive system 728 is activated to power stator segments 780.

Similarly, motor drive systems 728 may provide power via a circuit such as 500 shown in FIG. 8 or 600 shown in FIG. 9, so that stator segments 780 are selectively driven via line commutated inverters in the circuits. Power may be provided from the motor drive systems 728 as alternating current power, translated into direct current for the circuits 500, 600, and then processed by the line commutated inverters so as to drive the stator segments of the linear motor.

Power supplies 725 are representative of a power grid, and may derive power from, e.g., power stations, solar panels and/or other forms of power that can be placed on the power grid. The motor drive systems 728 are coupled to power supplies 725 to provide power in a synchronized pattern, so that stator segments 780 are powered as a pod 798 approaches, and depowered as a pod 798 departs. Therefore, stator segments 780 are powered in a synchronized manner that reflects the actual relative location of the pod 798 to each stator segment 780. The actual location of the pod 798 may be determined in a variety of manners including use of fixed sensors in the tube 700 that detect the presence of a pod 798 at a specific location in the tube 798.

Presence of a pod 798 at a specific location within a tube 700 can also be projected. For example, knowledge of the location of a pod 798 at a specific location and time can be combined with known acceleration characteristics of the linear motor within the tube 700 to project when the pod 798 will be at a specific location within the tube 700. Moreover, since the acceleration characteristics of the linear motor within the tube 700 are expected to remain the same over time, a plot of the trajectory and timing of a pod 798 in the tube 700 can be generated. Therefore, as long as the starting time for a pod 798 is known, a trajectory from start to finish can be used as a timing plan for the pod 798. In this way, the presence of the pod 798 at different times at hundreds or even thousands of different stator segments 780 within the tube can be projected.

The relative proximity of a pod 798 to a particular stator segment 780 can also involve a combination of detected locations of the pod and projections based on the detected locations. For example, a sensor may be placed at spaced locations, e.g., every 10 stator segments 780, and the detected presence of the pod 798 at a sensor can then be used to project the presence of the pod 798 at each of the additional stator segments 780. Alternatively, a plan may be provided before a pod 798 ever starts a journey through the tube 700, and the plan may plot the location and time of the pod at every stator segment 780 within a tube 700. When a plan is used, presence and speed of the pod 798 at specific locations within the tube 700 can be compared to the plan in order to account for any discrepancies between the plan and the actual positions of the pod 798 within the tube 100.

A plan can be generated in several ways. One way to generate a plan is to propel a pod 798 through a tube 700 and plot positions of the pod 798 within the tube at specific times. Another way to generate a plan is to identify acceleration characteristics of the linear motor, such as the force to be generated and the expected mass of a pod 798 to be propelled through the pod. Knowledge of the acceleration characteristics of the linear motor can be used to generate a plan that plots the position of the pod 798 within the tube 700 at different times relative to the absolute starting time of the pod. In this way, the same plan can be used over and over, and a process of synchronizing the power to stator segments can be automatically performed by a computer and a set of variable frequency drivers.

Tube 700 includes a track support 750 and stators 780. The stators 780 include interconnected blocks of windings, and are linked together by, e.g., joints, in sections of the tube 700 where pods are to be accelerated by the linear motor. The pod 798 is shown as separate from the magnetic element 799 (rotor). However, the magnetic element 799 may be a component of the pod 798. Regardless, the magnetic element 799 moves with the pod 798 through the tube 700, and serves as a rotor 799 of the linear motor described herein. In this way, electromagnetic force can be dynamically generated as the pod 798 moves through the tube 700.

The features of the present disclosure mainly relate to how energy is stored in and provided by a hybrid energy supply system, and how stator segments 780 can be selectively activated and deactivated. The hybrid energy supply system is an element of a motor drive system 728 in FIGS. 10*a* and 10*b*, and can dynamically obtain supplemental power from power supplies 725 on an as-needed or on-demand basis. In this way, when obtained from the grid, a large energy user such as described herein can dynamically obtain the supplemental power at off-peak demand times, for example. The energy can be stored in energy storage modules of the motor drive systems 728, and then dynamically provided via circuits 500, 600 to power stator segments 520, 620.

Power is supplied to the stator segments 780 in order to generate voltage that works together with the magnetic elements (or rotor) 799 to produce an electromagnetic force that propels the pods 798 through the tube 700. In this way, the magnetic elements (or rotor) 799 and stator segments 780 form a linear motor.

In accordance with embodiments, Medium-voltage (MV) is defined by the Institution of Electrical and Electronic Engineers (IEEE) as 1 kV to 100 kV. In an embodiment of the present disclosure, voltages up to 8410 volts are applied to the core of the stator of the linear motor.

Figure 11:
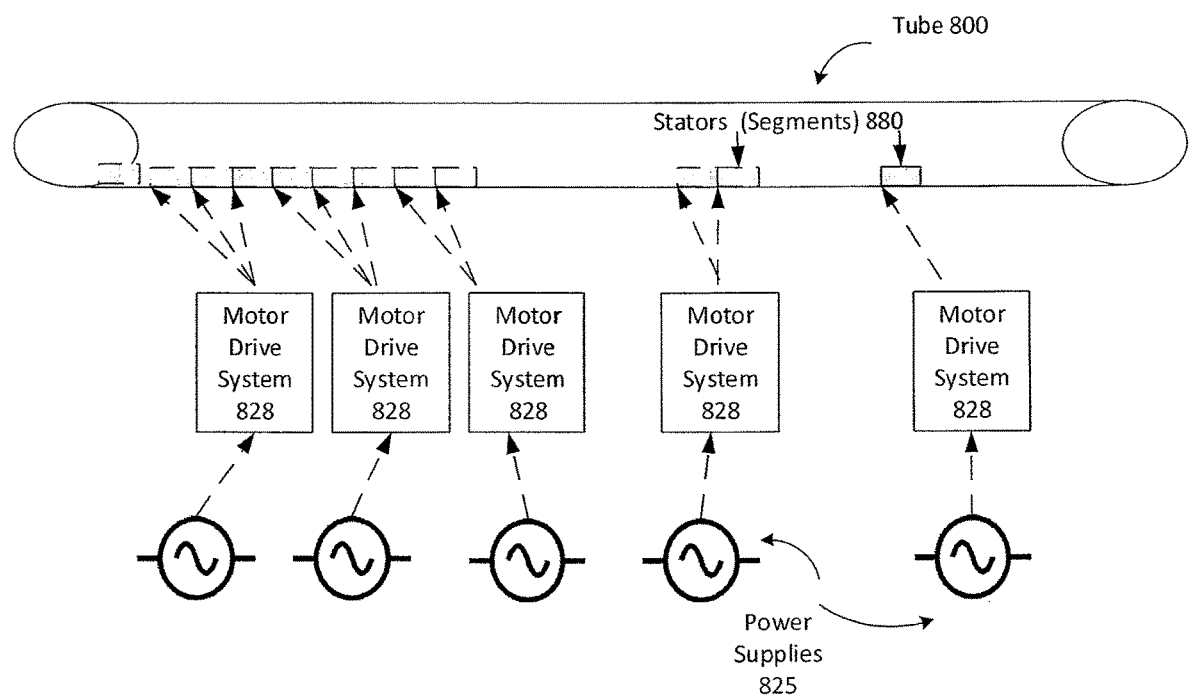
FIG. 11 is a view of another transportation system that includes a motor drive system for a linear motor, according to an aspect of the present disclosure.

FIG. 11 is a view of another transportation system that includes a motor drive system for a linear motor, according to an aspect of the present disclosure. In the embodiment of FIG. 11, stator segments 880 are shown placed at some portions of the tube 800 but not at others. In FIG. 11, stator segments 880 are selectively placed where pods are to be accelerated or decelerated, but need not be placed at numerous other locations along the tube 800. A concentration of stator segments 880, e.g., as shown at the leftmost portion of the tube 800, may be a location at which a pod is to be accelerated from 0 to a maximum intended speed. Individual stator segments 880 may also be placed and/or grouped together along tube 800 to boost or reaccelerate the pods to compensate for any deceleration due to air flows in the tube 800 or friction caused by contact with track supports or other elements in the tube 800. Of course, stator segments 880 may be used also to decelerate a pod 798, and may even be placed along the tube 800 specifically for the purpose of deceleration in locations where acceleration will not normally be provided.

In FIG. 11, the motor drive system 828 uses power from power supplies 825 to selectively power stator segments 880 as a pod 798 approaches. The motor drive systems 828 include the hybrid energy supply systems described herein to store and provide the power when needed. Power stored in low-power energy storage modules such as ultracapacitors, flywheel and/or other suitable devices can be converted by a low-voltage converter module to medium-voltage so as to power the stator segments 880. Additionally, as shown in FIG. 11, the motor drive systems 828 and any local power supplies 825 are positioned only where stator segments 880 are placed in the tube 800. As such, motor drive systems 828 and power supplies 825 are not necessarily placed along areas of the tube 800 where stator segments 880 are not required and acceleration or deceleration of pods is not anticipated.

Figure 12:
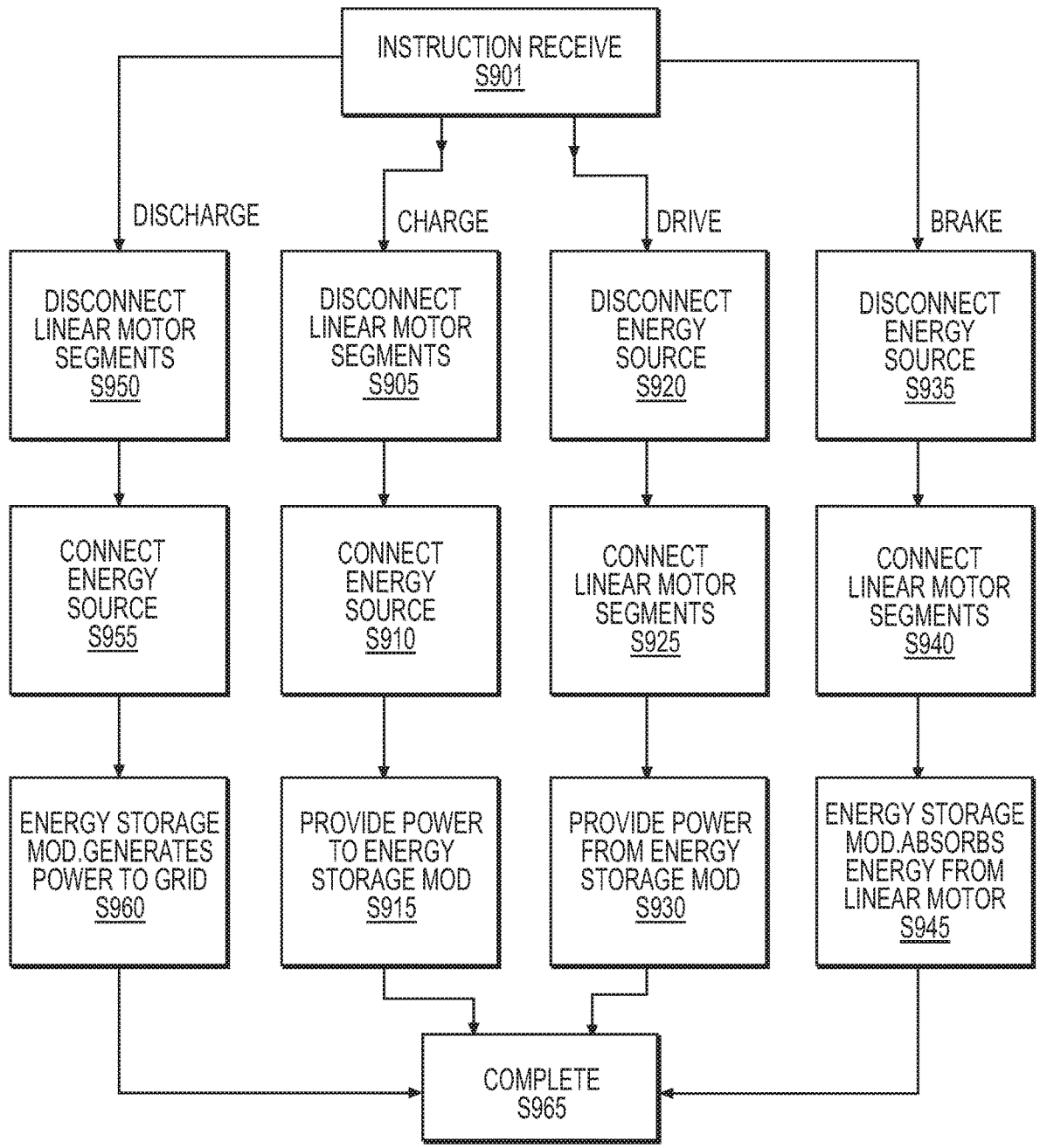
FIG. 12 is a flow chart for charging and discharging energy to and from a variable frequency drive system, according to an aspect of the present disclosure.

FIG. 12 is a flow chart for processes performed while charging and discharging energy to and from a hybrid energy supply system, according to an aspect of the present disclosure. At S901, an instruction is received to either drive (or brake) a pod via a stator segment, or to charge (or discharge) a low power storage module such as an ultracapacitor, flywheel, etc. If the instruction is to drive a pod, an external energy source 125 is disconnected at S920 from the energy storage module of the motor drive via switching elements such as first switching elements 122 shown in FIG. 1. One or more linear motor segments are connected, e.g., sequentially, at S925 via switches such as second switching elements 127 shown in FIG. 1. At S930, power is provided from motor drive with energy storage 130 to the connected linear motor segments 120 through a converter module 233, 233', 233", 233'". At S965, the process is complete.

If an instruction is received to brake the pod, an external energy source 125 is disconnected at S9350 from the energy storage module of the motor drive via switching elements such as first switching elements 122 shown in FIG. 1. One or more linear motor segments AUG connected, e.g., sequentially, at S940 via switches such as second switching elements 127 shown in FIG. 1. At S945, energy storage module 230 (ES1, ES2) absorbs energy from the linear motor segments 120. At S965, the process is complete.

If the instruction is to charge the of the energy storage module 230 (ES1, ES2), a linear motor segment 120 is disconnected at S905 via switching elements such as second switching elements 127 shown in FIG. 1. An external energy source 125 is connected at S910 to energy storage module 230 (ES1, ES2) via switches such as first switching elements 122 in FIG. 1. At S915, power is provided to charge energy storage module 230 (ES1, ES2). At S965, the process is again complete.

If an instruction is received to discharge the energy storage module 230 (ES1, ES2), a linear motor segment 120 is disconnected at S950 via switching elements such as second switching elements 127 shown in FIG. 1. An external energy source 125 is connected at S955 to energy storage module 230 (ES1, ES2) via switches such as first switching elements 122 in FIG. 1. At S960, energy storage module 230 (ES1, ES2) is discharged to generate power that is supplied to external energy source 125. At S965, the process is again complete.

As described with respect to FIG. 12, a hybrid energy supply system can be used to obtain and store power from power sources, and then provide the power on-demand to dynamically power stator segments of a linear motor in a transportation system. The synchronization shown in FIG. 12 can be implemented using a computer and communications network to control switches (switching elements), line commutated inverters, and motor drive systems. A computer may be used to receive information of a pod location, and then dynamically coordinate stator elements to activate as the pod approaches. Similarly, the computer may receive information regarding energy levels in low power energy modules, and determine when power should be obtained from energy sources for storage at the low power energy modules. Of course, multiple computers can be used to dynamically coordinate stator segment control and energy storage in a transportation system, and processes such as those described herein may be distributed among computers separately assigned to different individual computers.

As described, stator segments are individually powered in accordance with a preplanned routing, or dynamic instructions based on specifically confirmed locations of a pod moving through a tube. The stator segments can be powered using energy stored in the hybrid energy supply system described herein, and in accordance with individually controlled line commutated inverters as described herein. Power is selectively provided to stator segments in locations where the pod is to be accelerated or braked, and the power to different stator segments may be provided by different motor drive systems as described herein.

Additionally, as explained with respect to FIG. 11, stator segments 880 can be selectively turned on and off as a pod 798 approaches and departs. Adjacent stator segments 880 can be turned on at the same time that previous stator segments 880 are turned off, or the time in which stator segments 880 are powered may overlap either partially or fully. The powering of stator segments 880 can be synchronized so that even if several stator segments 880 are powered at the same time, a new stator segment 880 ahead of the pod 798 is provided power as power is shut off to the last powered stator segment 880 behind the pod.

Additionally, information may be passed between multiple motor drive systems to coordinate driving of stator segments. For example, a computer can coordinate and synchronize frequency and phase passing between motor drive systems for a tube that stretches hundreds of kilometers.

Positions and velocities of the pods can be identified by sensors such as velocity sensors placed at fixed locations within a tube. The position and velocity information can be used to help motor drive systems selectively power specific stator segments assigned to the motor drive systems. For example, a coordinating computer may coordinates and synchronizes power control by multiple different motor drive system.

FIG. 13 is an illustrative embodiment of a computer system, on which the disclosed methods relating to a hybrid energy supply system can be implemented, and which is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, for example, using a network 1001, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a portable telephone, a control system, a camera, a sensor, a coordinating computer, a variable frequency drive, or any other machine capable of executing a set of instructions (sequential or otherwise) that specify actions to be taken by that machine. The computer system 1000 can be incorporated as or in a particular device that in turn is in an integrated system that includes additional devices. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 13, the computer system 1000 includes a processor 1010. A processor for a computer system 1000 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 1000 is configured to execute software instructions in order to perform functions as described in the various embodiments herein. A processor for a computer system 1000 may be a general purpose processor or may be part of an application specific integrated circuit (ASIC). A processor for a computer system 1000 may also be a microprocessor, a microcomputer, a processor chip, a controller, a microcontroller, a digital signal processor (DSP), a state machine, or a programmable logic device. A processor for a computer system 1000 may also be a logical circuit, including a programmable gate array (PGA) such as a field programmable gate array (FPGA), or another type of circuit that includes discrete gate and/or transistor logic. A processor for a computer system 1000 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 1000 includes a main memory 1020 and a static memory 1030 that can communicate with each other via a bus 1008. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 1000 may further include a video display unit 1050, such as a liquid crystal display (LCD), an organic light emitting diode (OLED), a flat panel display, a solid state display, or a cathode ray tube (CRT). Additionally, the computer system 1000 may include an input device 1060, such as a keyboard/virtual keyboard or touch-sensitive input screen or speech input with speech recognition, and a cursor control device 1070, such as a mouse or touch-sensitive input screen or pad. The computer system 1000 can also include a disk drive unit 1080, a signal generation device 1090, such as a speaker or remote control, and a network interface device 1040.

In a particular embodiment, as depicted in FIG. 13, the disk drive unit 1080 may include a computer-readable medium 1082 in which one or more sets of instructions 1084, e.g. software, can be embedded. Sets of instructions 1084 can be read from the computer-readable medium 1082. Further, the instructions 1084, when executed by a processor, can be used to perform one or more of the methods and processes as described herein. In a particular embodiment, the instructions 1084 may reside completely, or at least partially, within the main memory 1020, the static memory 1030, and/or within the processor 1010 during execution by the computer system 1000.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 1082 that includes instructions 1084 or receives and executes instructions 1084 responsive to a propagated signal; so that a device connected to a network 1001 can communicate voice, video or data over the network 1001. Further, the instructions 1084 may be transmitted or received over the network 1001 via the network interface device 1040.

A coordinating computer as described herein may include the features shown in FIG. 13. Such a coordinating computer can coordinate when to dynamically activate line commutated inverters to drive active stator segments such as in FIGS. 8 and 9. Such a coordinating computer can also coordinate when to provide power from external energy supplies to low power energy storage modules such as ultracapacitors, flywheels, etc., or when to provide power from low power energy storage modules to use in powering stator segments. That is, at times certain stator segments in the proximity of a pod are selectively switched ON, and the remaining stator segments are switched OFF. In this way, both energy stored by energy storage modules and energy provided from energy storage modules to a circuit for a motor drive system 500, 600 is controlled using a computer such as computer 1000 shown in FIG. 13.

Although a hybrid energy supply system has been described with reference to several exemplary embodiments, it is understood that the words that have been used are words of description and illustration, rather than words of limitation. Changes may be made within the purview of the appended claims, as presently stated and as amended, without departing from the scope and spirit of a hybrid energy supply system in its aspects. Although a hybrid energy supply system has been described with reference to particular means, materials and embodiments, a hybrid energy supply system is not intended to be limited to the particulars disclosed; rather a hybrid energy supply system extends to all functionally equivalent structures, methods, and uses such as are within the scope of the appended claims.

Although the present specification describes components and functions that may be implemented in particular embodiments, the disclosure is not limited to such components, functions and embodiments.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a motor drive system for a linear motor includes multiple low-voltage modules that each store energy. The motor drive system also includes multiple first switching elements operable to connect the low-voltage modules to an energy source to charge the low-voltage modules, and multiple second switching elements operable to connect the motor drive system to the linear motor to power the linear motor.

According to another aspect of the present disclosure, the motor drive system includes at least one low-voltage power converter that converts power from the low-voltage modules of the motor drive system to supply to the linear motor via the second switching elements.

According to still another aspect of the present disclosure, each of the low-voltage energy storage modules comprises an ultracapacitor.

According to yet another aspect of the present disclosure, the low-voltage modules are connected in a Wye configuration.

According to another aspect of the present disclosure, the low-voltage modules are connected in a Delta configuration.

According to still another aspect of the present disclosure, at least two of the plurality of low-voltage modules are connected in series and comprise a medium-voltage motor drive, and receive power from an energy source via a common first switching element.

According to yet another aspect of the present disclosure, at least two of the multiple low-voltage modules are connected in series and comprise a medium-voltage motor drive, and provide power to the linear motor via a common switching element.

According to another aspect of the present disclosure, the second switching elements are operable to connect to different segments of the linear motor to selectively power the different segments of the linear motor.

According to still another aspect of the present disclosure, the different segments of the linear motor comprise fixed stator segments of the linear motor. Each of the different segments of the linear motor is selectively powered as a moving rotor of the linear motor approaches, and is selectively unpowered as the moving rotor of the linear motor departs.

According to yet another aspect of the present disclosure, each stator segment of the linear motor includes multiple coils molded together in a block.

According to another aspect of the present disclosure, the low-voltage module and the low-voltage power converter are provided together.

According to still another aspect of the present disclosure, the energy source provides a lower voltage to the motor drive system than the motor drive system provides to the linear motor.

According to yet another aspect of the present disclosure, the ultracapacitor is embedded in the low-voltage module.

According to another aspect of the present disclosure, the low-voltage modules and low-voltage power converter comprise a motor drive.

According to still another aspect of the present disclosure, the motor drive comprises a variable frequency drive used to drive the linear motor.

According to yet another aspect of the present disclosure, the motor drive is coordinated to drive a segment of the linear motor when a rotor approaches the segment of the linear motor.

According to another aspect of the present disclosure, the linear motor is aligned in a tube through which a pod is driven electromagnetically, and the moving rotor is carried by the pod.

According to still another aspect of the present disclosure, the interior of the tube is substantially vacuumed, and the pod is guided through the tube using at least one rail that extends through the tube.

According to yet another aspect of the present disclosure, the moving rotor comprises a magnet.

According to another aspect of the present disclosure, power from the power source is dynamically controlled based on positions of the pod as the pod moves through the fixed tube, so that the motor drive system drives the linear motor via the second switching elements as the pod approaches and so that the motor drive system stops driving the linear motor via the second switching elements as the pod moves away.

According to an aspect of the present disclosure, a linear motor system includes multiple line commutated inverters distributed along a linear motor and each having an alternating current side that outputs alternating current, and a direct current side that conveys direct current. The alternating current side of each line commutated inverter is connected to a stator segment of the linear motor, and the direct current sides of each line commutated inverter are connected in series.

According to another aspect of the present disclosure, the direct current sides of the line commutated inverters are connected in series to line commutated inverters that connect to an energy storage and to an energy source.

According to still another aspect of the present disclosure, the energy storage comprises an ultracapacitor.

According to still another aspect of the present disclosure, a direct current in a direct current loop smoothing inductor is built up by converting energy either from the energy source or from the energy storage via the respective line commutated inverter connected to the energy source or the energy storage.

According to another aspect of the present disclosure, the built up direct current is used to charge or discharge the energy storage via the line commutated inverter connected to the energy storage.

According to still another aspect of the present disclosure, as a rotor travels along the linear motor, the line commutated inverters connected to stator segments of the linear motor commutate the direct current sequentially into each phase of stator coils in the stator segments in order to form a moving flux that drives the rotor.

According to yet another aspect of the present disclosure, the line commutated inverters connected to stator segments which are not currently powered bypass the direct current by turning on a plurality of thyristors in one or more phases.

According to another aspect of the present disclosure, a direct current inductor is implemented using passive stator coils that are not currently powered, and selected thyristors are activated such that passive stator coils are connected in the direct current loop to provide direct current inductance.

According to still another aspect of the present disclosure, the distributed line commutated inverters are connected to the linear motor to reduce torque ripples. Each of the distributed line commutated inverters have multiple phase legs, and adjacent line commutated inverters operate with phase shifts.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A motor drive system for a linear motor, comprising:
   a plurality of low-voltage modules that each store energy; and
   a plurality of switches operable to connect the motor drive system to the linear motor to power the linear motor,
   wherein at least two of the plurality of low-voltage modules are connected in series and comprise medium-voltage motor drive, and provide power to the linear motor via a common switch,
   wherein the plurality of switches are operable to connect to different segments of the linear motor to selectively power the different segments of the linear motor,
   wherein the different segments of the linear motor comprise fixed stator segments of the linear motor,
   wherein each of the different segments of the linear motor is selectively powered as a moving rotor of the linear motor approaches, and is selectively unpowered as the moving rotor of the linear motor departs,
   wherein the linear motor is aligned in a tube through which a pod is driven electromagnetically, and
   wherein the moving rotor is carried by the pod.

2. The motor drive system of claim 1,
   wherein each of the low-voltage modules comprises an ultracapacitor.

3. The motor drive system of claim 1,
   wherein each of the low-voltage modules comprises a flywheel.

4. The motor drive system of claim 1,
   wherein the low-voltage modules are connected in a Wye configuration.

5. The motor drive system of claim 1,
   wherein the low-voltage modules are connected in a Delta configuration.

6. The motor drive system of claim 1,
   wherein each fixed stator segment of the linear motor comprises a plurality of coils molded together in a block.

7. The motor drive system of claim 1,
   wherein the interior of the tube is substantially vacuumed, and
   wherein the pod is guided through the tube using at least one rail that extends through the tube.

8. The motor drive system of claim 7,
   wherein the moving rotor comprises a magnet.

9. The motor drive system of claim 1,
   wherein power from the power source is dynamically controlled based on positions of the pod as the pod moves through the fixed tube, so that the motor drive system drives the linear motor via the switches as the pod approaches and so that the motor drive system stops driving the linear motor via the switches as the pod moves away.

* * * * *